United States Patent
Testut et al.

(10) Patent No.: US 7,938,905 B2
(45) Date of Patent: May 10, 2011

(54) METHOD FOR PRODUCING CONCRETE PARTS AND STRUCTURE

(75) Inventors: Michel Testut, Genas (FR); Serge Sabio, Saint Just Cheleyssin (FR); Hervé Fryda, Meyrie (FR)

(73) Assignee: Kerneos, Neuilly-sur-Seine (FR)

( * ) Notice: Subject to any disclaimer, the term of this patent is extended or adjusted under 35 U.S.C. 154(b) by 444 days.

(21) Appl. No.: 12/095,252

(22) PCT Filed: Nov. 28, 2006

(86) PCT No.: PCT/FR2006/002598
§ 371 (c)(1), (2), (4) Date: May 28, 2008

(87) PCT Pub. No.: WO2007/060340
PCT Pub. Date: May 31, 2007

(65) Prior Publication Data
US 2009/0025613 A1    Jan. 29, 2009

(30) Foreign Application Priority Data
Nov. 28, 2005 (FR) ..................... 05 12011

(51) Int. Cl.
*C04B 7/02* (2006.01)
*C04B 24/00* (2006.01)

(52) U.S. Cl. ........ 106/713; 106/692; 106/724; 106/728; 106/819

(58) Field of Classification Search .................. 106/692, 106/695, 713, 724, 728, 819
See application file for complete search history.

(56) References Cited

U.S. PATENT DOCUMENTS

| | | | | | |
|---|---|---|---|---|---|
| 3,973,978 | A | * | 8/1976 | Nakagawa et al. | 106/694 |
| 4,082,561 | A | * | 4/1978 | Nakagawa et al. | 106/695 |
| 4,357,167 | A | * | 11/1982 | Kellet et al. | 106/694 |
| 4,455,171 | A | | 6/1984 | Spensley et al. | |
| 5,560,774 | A | * | 10/1996 | B urge et al. | 106/692 |
| 6,887,309 | B2 | * | 5/2005 | Casanova et al. | 106/644 |
| 7,029,527 | B2 | * | 4/2006 | Gaudry et al. | 106/695 |
| 2009/0025613 | A1 | * | 1/2009 | Testut et al. | 106/695 |

FOREIGN PATENT DOCUMENTS
FR    2 810 314    12/2001

OTHER PUBLICATIONS

JP 60210553 A (Oct. 23, 1985) Tanaka et al. abstract only.*
"Quick Setting property and hydration of Portland cement with accelerating agent based on calcium aluminate", Takehiro et al., Zairyo (2000), 49(2), 209-214. abstract only.*
"Interaction of superplasticizers with calcium aluminate cements", Fryda et al. (2000), American Concrete Institute, SP (2000), SP-195 (Sixth CANMET/ACI International Conference on Superplasticizers adn other Chemical Admixtures in Concrete (2000), 91-100.*
International Search Report dated May 29, 2007.

* cited by examiner

*Primary Examiner* — Paul Marcantoni
(74) *Attorney, Agent, or Firm* — Young & Thompson

(57) ABSTRACT

A method for producing concrete parts and a structure includes (i) supplying a first concrete composition based on a quick binder containing Portland cement, curing accelerator system based on $Al_2O_3$, CaO lime and $SO_3$ sulphates, a retardant system and a superplasticizer, (ii) adding a releaser system for forming a second concrete composition and pouring the second concrete composition into a concrete form. The use of a releaser system and the preparation of the first concrete composition are also disclosed.

25 Claims, No Drawings

METHOD FOR PRODUCING CONCRETE PARTS AND STRUCTURE

TECHNICAL FIELD

The invention relates to a method for producing concrete parts and structures using quick binder compositions.

By quick binders for mortar or concrete is meant quick setting and hardening binders based on Portland cements, calcium aluminates and calcium sulfates. The concretes using such binders in their compositions, once implemented, adopt short-term high mechanical features after adding a component designated as releaser; they exhibit preferably a compression strength Rc of at least 1 MPa 2 hours after adding the releaser to a first composition. If the releaser is added no later than 2 hours once the first primary composition has been kneaded, the compression strength RC is at least 1 MPa after 4 hours, counted after the first composition has been kneaded.

These concretes are fluidic or self-compacting concretes with at least 1 hour workability keeping time before adding the releaser, and at least ½ hour after adding the releaser.

The workability of the fluidic concretes is measured by the Abrams cone slump height—or slump value—(according to the NF P 18-451 French standard, dated December 1981) and concrete is considered as fluidic when said slump is at least 15 cm, preferably at least 18 cm.

The workability of selfcompacting concretes (also designated as selfpositioning) is measured at generally on the basis of 'slumpflow', according to the operating mode described in "Specification and Guidelines for Self Compacting Concrete, EFNARC, February 2002, p 19-23"; the spread value is, generally, 650 mm minimum for selfcompacting concretes and 800 mm maximum.

In the case of mortars, consistency may be measured at generally on the basis of 'slumpflow', according to the operating mode described in "Specification and Guidelines for Self Compacting Concrete, EFNARC, February 2002, p 19-23", using a ½ scale cone. Mortars will be considered as equivalent to fluidic concretes when the spread value is greater than 200 mm, selfpositioning above 300 mm.

The invention relates to concretes, and more particularly fluidic or selfcompacting concretes, intended for the production of parts and structures, regardless whether factory-prefabricated parts or structures built on sites, such as for example concrete shells, slabs, etc.

TECHNOLOGICAL BACKGROUND

FR-A-2810314 describes a quick binder for selfcompacting concrete containing Portland cement, the calcium aluminate, calcium sulfate, a curing accelerator, a retarder and a superplasticizer agent such as polyphosphonate polyox. In this document, it is stated that this binder enables to have a workability duration greater than 1 hour, to pump the concrete thanks to this selfcompacting formulation, while having high compression mechanical strengths as soon as 4 hours after completed kneading, including at temperatures ranging between 5 and 35° C. The applications described in this document are the emergency repair of structures, provisional timbering of tunnels, galleries or other similar structures.

This document FR-A-2810314 describes quick binder compositions for selfcompacting concretes which are realised by mixing all the components in a single step, wherein each composition leads to a given compromise between the workability keeping time and the rapid acquisition of the strength requested. Each modification of this compromise implies re-formulation of a new composition.

Document EP-A-0769482 describes binder compositions used for application of projected concretes; but the addition thereto of a curing accelerator component causes ultra quick hardening, without any workability keeping time after addition of the curing accelerator. This makes the implementation such compositions in all the factory and on-site applications impossible where concrete is poured in place.

There is the need however for a method for producing concrete parts and structures using quick binder-based concrete compositions, which would enable to dissociate the time period during which it is necessary to keep the workability of the composition from the end of the kneading to the time of pouring, for instance with ready-to-use concrete requiring a certain transport time before pouring, from the time period when quick hardening should be released so as to obtain minimum short-term strength, sufficient for instance for removing the concrete form.

SUMMARY OF THE INVENTION

The invention provides hence a method for producing concrete parts and structures, including the following steps:
(i) supplying a first concrete composition based on a quick binder containing:
   60 to 95% Portland cement;
   5 to 40% curing accelerator system based on $Al_2O_3$ alumina, CaO lime and $SO_3$ sulfate; wherein sulfates may be, for instance, metallic, alkaline, alkaline-earth sulfates, organic sulfates, or mixtures; preferably, the curing accelerator system will be based on calcium aluminate and calcium sulfate;
   a retarder system; and
   a superplasticizer containing a polyphosphonate polyox type polymer, or a mixture of polymers of the type polyphosphonate polyox and polycarboxylate polyox;
   then
(ii) adding a releaser system to form a second concrete composition; and
(iii) pouring this second concrete composition in a concrete form.

According to an embodiment, the step (i) is a wet mixing step wherein the first primary composition is prepared and which contains the following steps:
(a) a concrete composition is prepared containing, on the base of the quick binder:
   60 to 95% Portland cement;
   the retarder system; and
   a superplasticizer containing a polyphosphonate polyox type polymer, or a mixture of polymers of the type polyphosphonate polyox and polycarboxylate polyox;
   then
(b) adding, on the base of the quick binder:
   5 to 40% curing accelerator system based on $Al_2O_3$ alumina, CaO lime and $SO_3$ sulfate; wherein sulfates may be, for instance, metallic, alkaline, alkaline-earth sulfates, organic sulfates, or mixtures; preferably, the curing accelerator system will be based on calcium aluminate and calcium sulfate.

According to an embodiment, the method includes the following steps:
(i) supplying by wet mixing in a ready-mix plant a first concrete composition based on a quick binder;
then
(ii) adding a releaser system; and
(iii) pouring the concrete immediately after the releaser system addition step (ii).

The step (ii) may be implemented in a truck-mixer.

The step (iii) consisting in pouring the second concrete composition in a concrete form may be conducted with a second concrete composition exhibiting (a) a slump test value ranging from 15 to 24 cm, preferably from 18 to 22 cm or (b) a slump test value ranging from 580 to 750 mm, preferably from 650 to 750 mm.

According to an embodiment, the second concrete composition exhibits a compression mechanical strength Rc of at least 1 MPa 2 hours after the step (ii); if the releaser is added no later than 2 hours after the step (i), the compression mechanical strength Rc is at least 1 MPa 4 hours after the step (i).

According to an embodiment, the first concrete composition has a workability keeping time of at least 1 hour after the step (i) for wet mixing.

According to an embodiment, the second concrete composition has a workability keeping time of at least 30 minutes after the step (ii) for wet mixing.

The invention also relates to the use of a releaser system by addition to a first quick concrete composition in a method of preparation of concrete objects as defined in the present invention.

The invention also relates to the preparation of a first quick concrete composition intended for being added a releaser system for a method of preparation of concrete parts and structures, such as defined in the present invention.

The invention thus enables to produce a base concrete with a long workability keeping time to which it suffices to add as appropriate, for instance just before pouring, another component releasing quick hardening and enabling short-term mechanical strength. It is thus possible from a solely basic concrete composition to reach the different compromises requested in terms of workability keeping time/quick acquisition of strengths. The invention thus offers a polyvalent solution which applies to the cements described in the European standard EN 197-1.

DESCRIPTION OF EMBODIMENTS OF THE INVENTION

The invention is now explained more in detail in the following description.

The invention is based upon the postponed addition of a releaser system to a first concrete composition, before the implementation thereof.

The binder involved in the composition of fresh concrete contains:

60 to 95% Portland cement;

5 to 40% in weight of an curing accelerator system based on $Al_2O_3$ alumina, CaO lime and $SO_3$ sulfate; wherein the sulfates may be, for instance, metallic, alkaline, alkaline-earth sulfates, organic sulfates, or mixtures; preferably, the curing accelerator system is based on calcium aluminate and calcium sulfate;

a retarder system; and a superplasticizer containing a polyphosphonate polyox type polymer, or a mixture of polymers of the type polyphosphonate polyox and polycarboxylate polyox.

Preferably, the binder contains:

70 to 85% Portland cement;

10 to 25% in weight of a curing accelerator system based on calcium aluminate and calcium sulfate.

Portland cement is conventional and complies with the families described in the European standard EN 197-1.

Advantageously, Portland cement is a quick cement (so-called R type), preferably crushed to a fineness of at least 4000 $cm^2/g$. The cement may be HIS type (High Initial Strength). For instance, 52.5 N or R CEM1, 32.5, 32.5 R, 42.5 or 42.5 R type CEM2 cement may be used. The ratio of soluble alkalines will be preferably lower than 1% in weight expressed in $Na_2O$ equivalent. The invention applies to the cements described in the European standard EN 197-1.

The amount of Portland cement is generally, relative to the weight of the binder, from 60 to 95%%, preferably from 70 to 85%, typically approximately 80%.

The curing accelerator system is based on $Al_2O_3$ alumina, CaO lime and $SO_3$ sulfate.

Its composition is generally as follows, in weight:

| | |
|---|---|
| $Al_2O_3$ alumina: | 35 to 50% |
| CaO lime: | 10 to 50% |
| Sulfate (expressed in $SO_3$): | 5 to 30% |

Preferably, the curing accelerator system will be based on calcium aluminate and calcium sulfate.

The calcium aluminate liable to be used in the invention includes CA and/or C3A and/or C12A7 mineralogical phases.

The calcium sulfate may be in any suitable form, i.e. semi-hydrate, dihydrate, anhydrite (II or III), etc. Anhydrite will be used for instance.

The mass ratio between the calcium aluminate and the calcium sulfate ranges generally between 1:4 and 4:1, preferably between 1:2 and 2:1.

The amount of the curing accelerator system depends on the operating temperature of the concrete, the exact implementation method, the level of strengths to aim for, etc. It is generally 5 to 40% and preferably 15 to 25%, typically approximately 20% relative to the weight of the quick binder.

The retarder system may be any conventional system. In particular it may be of carboxylic type, in the form of carboxylic acid, in particular citric, tartaric, gluconic acid or similar, or of boric type or in the form of the corresponding salts. Optionally another mineral additive providing or using calcium may also be used; sodium, potassium, lithium, strontium or barium carbonates or fluorides may be mentioned, as well as calcium complexing agents such as EDTA.

The amount of the retarder system depends on the workability keeping time requested, the operating temperature of the concrete, the exact implementation method, the level of strengths to aim for, etc. The quantities are generally, relative to the cumulated weight of the Portland cement and of the curing accelerator system, 0.05 to 5% and preferably 0.1 to 1%, typically approximately 0.3 to 0.45%.

The superplasticizer contains a polyphosphonate polyox corresponding to the compound described in FR-A-2810314 and FR-A-2696736 as well FR-A-2689895, documents to which it is referred explicitly for a detailed description. For instance, polyphosphonate polyox may be formed of a water-soluble or water-dispersible organic compound, comprising at least one amino-di(alkylene-phosphonic) moiety and at least one polyoxyalkylated chain or at least one of its salts.

It may also contain a mixture of polymers such as polyphosphonate polyox and in particular polycarboxylate polyox. Polycarboxylate polyox type superplasticizers are generally known, and it may be referred to the description of patents US20030127026 (U.S. Pat. No. 6,858,074) and US20040149174.

The amount of the superplasticizer is generally, relative to the cumulated weight of the Portland cement and of the curing accelerator system, 0.5 to 5% and preferably 1 to 3%, typically approximately 2 to 2.5%.

The concrete containing this superplasticizer may be of fluid or selfcompacting consistency.

The releaser may be selected among the group consisting of:

- aqueous suspension containing (i) at least one calcium aluminate, (ii) from 0.5 to 4%, preferably from 0.6 to 2.3%, in weight relative to the total weight of the calcium aluminate(s), of a setting inhibitor of the aluminous cements, and (iii) at least one settling-preventing agent; such a suspension is described in FR-A-2849440, of Lafarge Aluminates, to which it is referred for further information;
- a transition alumina; such a transition alumina is available for instance as RHOXIMAT SA 502 from Rhodia company;
- an alumina hydroxide gel; such an alumina hydroxide gel is available, for instance, as GECEDRAL BZ 111 from Degussa company;
- a mixture thereof.

The amount of the releaser depends on the temperature of the concrete, the amount of the curing accelerator system used, the level of initial strength requested. It is added, relative to the cumulated weight of the Portland cement and of the curing accelerator system, generally in an amount of 1 to 10% and preferably 2 to 5%, typically approximately 2.5 to 3.5%.

The compounds of the final concrete composition may be introduced for instance in the following order:

- according to a first embodiment, the Portland cement and the curing accelerator system, the retarder and the superplasticizer are wet mixed, then the releaser is added after a given time;
- in a second embodiment, the cement and the superplasticizer are wet mixed, then the curing accelerator system and the retarder are added after a given time; then the releaser is added after a given time.

The first embodiment will be preferred, since the different constituents (cement, superplasticizer, curing accelerator, retarder) may also be added at the ready-mix plant, while the releaser may be added at the truck-mixer before leaving or on the road, on the building site, just before pouring the concrete.

According to the first embodiment, the releaser may be added as soon as 10 minutes after kneading the other constituents, preferably as soon as 60 minutes after kneading the other constituents (cement wet mixing in step (i)), and no later than 8 hours after.

The releaser may also be added immediately before the concrete pouring operation (the step (ii) is implemented immediately before the step (iii) for pouring concrete), and this regardless of the time elapsed from the wet mixing step in the ready-mix plant, "immediately" should be understood as ranging between 5 and 15 minutes before starting the pouring operation.

According to the second embodiment, the curing accelerator and the retarder may be added 10 to 90 minutes, preferably 10 to 45 minutes after the wet mixing step. The releaser may be added as soon as 10 minutes after kneading the other constituents.

The releaser may also be added, as above, immediately before the pouring operation, and this regardless of the time elapsed from the first addition of the curing accelerator and of the retarder. As above, the releaser may hence be added immediately before the concrete pouring operation, "immediately" should be understood as ranging between 5 and 15 minutes before starting the pouring operation.

Regardless of the embodiment, the releaser is not added, generally, more than 8 hours counted from the wet mixing step of Portland cement.

Generally speaking, the effective water/dry binder weight ratio is generally comprised between 0.35 and 0.50.

The final composition contains generally conventional aggregates (sands, grits, and/or gravels). Preferably, the constituents of the final composition have a size smaller than or equal to 20 mm. The composition may thus be pumped easily.

The aggregate/binder dry weight ratio is generally comprised between 4 and 5.

The concrete compositions according to the invention are easy to be implemented. They have a suitable rheology, involving preferably a workability duration (after wet mixing) of one hour minimum and one hour and a half to two hours maximum and very quick hardening.

Keeping the workability is characterised in particular:

- either by keeping the Abrams cone concrete slump value corresponding to the typical value of a fluidic concrete of at least 15 cm
- or, in the case of a selfcompacting concrete, by keeping the slump flow value corresponding to the typical value of a selfcompacting concrete of at least 650 mm,
- or, in the case of a mortar, by keeping the slump flow value corresponding to a value of at least 200 mm.

The invention provides hence a concrete composition which may exhibit a compression strength of at least 1 MPa 2 hours after adding the releaser to a first composition. When the releaser is added no later than 2 hours once the first composition has been kneaded, the compression mechanical strength Rc is at least 1 MPa 4 hours, counted from the end of the kneading of the first composition. It is measured on 16 cm×32 cm cylindrical test pieces.

Both these workability holding and short-term high strength properties enable in particular to produce a precursor concrete composition in a ready-mix plant and for instance to transport said composition to a building site via a truck-mixer, wherein the composition hardens rapidly once implemented, after adding the releaser. In this example the curing accelerator system is preferably added in the ready-mix plant. These qualities of the binder also enable to pump it mechanically thanks to its fluidity and to pour or pump it into a form while obtaining quick hardening.

The invention concerns more particularly a quick binder for fluidic or selfcompacting concretes, easily pumpable or pourable, being positioned in the forms without any vibrations, in the case of the selfcompacting concretes. The invention is useful for the manufacture of concrete parts and structures, regardless they are factory prefabricated parts, or structures built on sites, such as for example concrete shells, slabs, etc., at external temperatures ranging in particular between −5° C. and 30° C., in particular smaller than 10° C.

EXAMPLES

The following examples illustrate the invention without being limited thereto.

Example 1

A first mortar composition is prepared (in g for 1 litre mortar):

| | |
|---|---|
| CEM 1 52.5 cement | 517 g |
| 0/4 sand | 1327 g |
| BL 200 filler | 129 g |
| SECAR 51, from Lafarge Aluminates | 54.8 g |
| Anhydrite | 34.2 g |

-continued

| | |
|---|---|
| OPTIMA 175 superplasticizer from CHRYSO: in weight relative to the weight of the CEM 1 + SECAR 51 cement | 1.2% |
| Citric acid: | 2.3 g |
| Total water | 267 g |

(The OPTIMA 175 superplasticizer has a 30% dry extract, measured according to EN 480-8 standard).

Four mixtures of fresh mortar are realised successively according to this first composition.

A second composition is then prepared by adding the releaser at each wet mixing operation, following a given interval, counted from the end of the kneading, in an amount of 14.7 g.

The releaser is an aqueous suspension having the following composition, in % weight:

| | |
|---|---|
| Water | 38.36% |
| Boric acid | 2.13% |
| CP10 plasticizer | 0.39% |
| Aluminous cement | 58.81% |
| Xanthan gum | 0.16% |
| K 35R biocide | 0.15% |

The CP plasticizer is a product marketed by BASF. The K 35R biocide is a product marketed by PROGIVEM.

For each mortar, the spread obtained during flow test will be measured in mm after 15, 30, 60, 90 minutes counted from the end of the kneading of the first composition.

The test pieces intended for measuring compression mechanical strengths Rc are made immediately after adding the releaser.

The deadline for measuring the mechanical strength after 4 hours and 5 hours and a half is counted after the end of the kneading operation of the first composition.

The RC 2 is measured 2 hours after adding the releaser.

The temperature of the tests is 15° C.

The results obtained are as follows:

TABLE 1

| Releaser addition deadline | 15 mn flow | 30 mn flow | 60 mn flow | 90 mn flow | 120 mn flow | 2 hour Rc | 4 hour Rc | 5H30 Rc |
|---|---|---|---|---|---|---|---|---|
| 30 mn | 300 | 330 | 315 | 210 | N.M* | 1.5 | 4 | 12 |
| 60 mn | 300 | 300 | 285 | 250 | 150 | 1.3 | 2 | 11 |
| 90 mn | 300 | 300 | 290 | 250 | 200 | 1.1 | 1.5 | 8.5 |

N.M*: stiff mortar; flow non-measurable.

These results put in evidence that:
  regardless of the deadline at which the releaser is added, the mortars remain fluidic/selfpositioning 30 minutes to a minimum after adding the releaser,
  in spite of this long workability keeping time, the short-term mechanical strength acquired is at least 1 MPa 2 hours after adding the releaser, in all cases at least 1 MPa 4 hours, counted from the end of the kneading of the first composition.

Example 2

A first mortar composition is prepared (in g for 1 litre mortar):

| | |
|---|---|
| CEM 1 52.5 N cement | 507 g |
| 0/4 sand | 1327 g |
| BL 200 filler | 129 g |
| SECAR 51, from Lafarge Aluminates | 63.7 g |
| Anhydrite | 39.8 g |
| OPTIMA 175 superplasticizer from CHRYSO: relative to the weight of the cement CEM 1 + SECAR 51 | 1.2% |
| Citric acid: | 2.3 g |
| Total water | 267 g |

Four mixtures of fresh mortar are realised successively, according to this composition.

A second composition is then prepared by adding the releaser, which is that of the example 1, after 60 minutes, counted from the end of the kneading of the first composition.

The spreads obtained during flow test are measured in mm after 15, 90, 120, minutes, counted from the end of the kneading of the first composition.

The test pieces intended for measuring compression mechanical strengths Rc are performed immediately as soon as the releaser has been kneaded.

The deadline for measuring the mechanical strength after 4 hours, 5 hours and a half and 24 hours is counted after the end of the kneading operation of the first composition.

The RC 2 is measured 2 hours after adding the releaser.

The temperature of the tests is 18° C.

The results obtained are as follows:

TABLE 2

| Added amount of releaser | 15 mn flow | 90 mn flow | 120 mn flow | 2 hour Rc | 4 hour MPa Rc | 5 hour 30 MPa Rc | 24 hour MPa Rc |
|---|---|---|---|---|---|---|---|
| 0 | 220 | 140 | 60 | 0.3 | 1 | 10 | 15.5 |
| 8.2 g | 220 | 165 | 60 | 1 | 2.5 | 11 | 15.5 |
| 16.3 g | 220 | 200 | 75 | 1.7 | 5 | 11 | 15 |
| 22 g | 220 | 220 | 90 | 1.5 | 4 | 10 | 14 |

These results put in evidence the influence of the amount of releaser on the workability keeping time and on the minimal amount which enables to reach the compromise between the workability keeping time and the mechanical strength.

Example 3

A first series of tests is performed at 5° C.

Three first fluidic concrete compositions B1, B2, B3 are prepared having the following compositions for 1 m³:

| | |
|---|---|
| CEM 1 52.5 cement | 294 kg |
| Le Vernet 0/4 sand | 750 kg |
| 4/14 mm granulate | 1050 kg |
| Filler | 100 kg |
| SECAR 51: | 60.3 kg |
| Anhydrite: | 37.7 kg |
| Citric acid: | 1.36 Kg |
| Optima 175 | 5.00 kg for B1 |
| | 6.53 kg for B2 |
| | 6.83 kg for B3 |
| Total water | 175 litres |

These concretes are realised, each with a different CEM 1 52.5 cement, having the following features:

TABLE 3

| Concrete ref. | CEM1 cement | C3S % | C2S % | C3A % | C4AF % | Soluble K % | Soluble Na % |
|---|---|---|---|---|---|---|---|
| B1 | Le Havre | 61.4 | 12.1 | 10.2 | 5.2 | 0.21 | 0.11 |
| B2 | La Couronne | 58.0 | 14.3 | 7.6 | 8.4 | 0.71 | 0.05 |
| B3 | Val d'Azergues | 58.5 | 15.4 | 0.4 | 14.5 | 0.62 | 0.09 |

The second concrete compositions are then prepared by adding the releaser which is that of example 1; it is inserted 1 hour after kneading all the previous constituents.

The amount for each concrete is 9 kg/m$^3$.

For each concrete, the slump obtained with the Abrams cone will be measured in cm after 15, 90 and 120 counted from the end of the kneading of the first composition, and the test pieces intended for measuring the compression mechanical strengths Rc will be prepared immediately after adding the releaser.

The deadline for measuring the mechanical strength 4 hours, 5 hours and a half and 24 hours is counted from the end of the kneading of the first composition.

The RC 2 is measured 2 hours after adding the releaser.

The results obtained are as follows;

TABLE 4

| Concrete ref | 15 mn flow | 90 mn flow | 120 mn flow | 2 hour Rc | 4 hour MPa Rc | 5 hour 30 MPa Rc | 24 hour MPa Rc |
|---|---|---|---|---|---|---|---|
| B1 | 24 | 23 | 21 | 1 | 2 | 12 | 17 |
| B2 | 24 | 22 | 22 | 1.5 | 3.5 | 15.5 | 22 |
| B3 | 24 | 22 | 22 | 1.1 | 2 | 14 | 23 |

A second series of tests is performed at 20° C.

Four first fluidic concrete compositions B4, B5, B6, B7 are prepared having the following compositions for 1 m3.

| | |
|---|---|
| CEM 1 52.5 cement | 294 kg |
| Le Vernet 0/4 sand | 750 kg |
| 4/14 mm granulate | 1050 kg |
| Filler | 100 kg |
| SECAR 51 | 27.44 kg |
| Anhydrite | 17.18 kg |
| Citric acid | 1.46 kg |
| Optima 175 | 4.77 kg for B4 |
|  | 5.70 kg for B5 |
|  | 5.60 kg for B6 |
|  | 7.24 kg for B7 |
| Total water | 175 litres |

These concretes are realised, each with a different CEM 1 52.5 cement, having the following features (the three first are those mentioned in Table 4):

TABLE 5

| Concrete ref. | CEM1 cement | C3S % | C2S % | C3A % | C4AF % | Soluble K % | Soluble Na % |
|---|---|---|---|---|---|---|---|
| B4 | Le Havre | 61.4 | 12.1 | 10.2 | 5.2 | 0.21 | 0.11 |
| B5 | La Couronne | 58.0 | 14.3 | 7.6 | 8.4 | 0.71 | 0.05 |
| B6 | Val d'Azergues | 58.5 | 15.4 | 0.4 | 14.5 | 0.62 | 0.09 |
| B7 | Saint Pierre LC | 54.8 | 16.6 | 7.3 | 9.1 | 0.62 | 0.10 |

The second concrete compositions are then prepared by adding the releaser which is that of example 1; it is inserted within 1 hour after kneading all the previous constituents.

The amount for each concrete is 9 kg/m3.

For each concrete, the slump obtained with the Abrams cone will be measured in cm after 15, 90 and 120 counted from the end of the kneading of the first composition, and the test pieces intended for measuring the compression mechanical strengths Rc will be prepared immediately after adding the releaser.

The deadline for measuring the mechanical strength 4 hours, 5 hours and a half and 24 hours is counted from the end of the kneading of the first composition.

The RC 2 is measured 2 hours after adding the releaser.

The results obtained are as follows:

TABLE 6

| Concrete ref | 15 mn slump | 90 mn slump | 120 mn slump | 2 hour Rc | 4 hour MPa Rc | 5 hour 30 MPa Rc | 24 hour MPa Rc |
|---|---|---|---|---|---|---|---|
| B1 | 24 | 24 | 13 | 1.7 | 4 | 8 | 10 |
| B2 | 23 | 24 | 12 | 4 | 7 | 11 | 12 |
| B3 | 24 | 22 | 21 | 2.7 | 6 | 10 | 12 |
| B4 | 19 | 20 | 20 | 2.5 | 5 | 9 | 12 |

These two series of tests put in evidence that:
- at 5° C. and 20° C., the concretes obtained remain fluidic at least 30 minutes counted from the end of the kneading with the releaser;
- a mechanical strength acquired of at least 1 MPa is obtained 2 hours after adding the releaser, in all cases of at least 1 MPa 4 hours counted from the end of the kneading of the first composition;
- these features are obtained with cements having quite different mineralogical compositions and soluble alkaline contents; this demonstrates the polyvalence of the system.

Example 4

Tests were conducted with different CEM 2 cements from LAFARGE, i.e.:
Ref C1-CEM 2/A-S 52.5 N La Malle
Ref C2-CEM 2/B-M (S-LL) 42.5 Le Teil
Ref C3-CEM 2/B-LL 32.5R Val d'Azergues
Ref C4-CEM 2/B-LL 42.5N Val d'Azergues
Ref C5-CEM 2/B-LL 32.5R Le Havre With each concrete, different first mortar compositions each including (in g for 1 litre mortar) the following components:

| | |
|---|---|
| CEM 2 cement | 512 g |
| St Bonnet 0/4 sand | 1327 g |
| BL 200 filler | 129 g |
| Total water | 267 g |

Two series of tests are performed at 20° C.

For each series the first compositions are complemented with the other components as defined in Table 7 (in g for 1 litre mortar).

TABLE 7

| Ref CEM 2 | SECAR 51 | Anhydrite | Citric acid | Optima 175 |
|---|---|---|---|---|
| First series of tests |
| C1 | 57.8 | 36.2 | 2.4 | 16.13 |
| C2 | 57.8 | 36.2 | 2.4 | 14.23 |
| C3 | 57.8 | 36.2 | 2.4 | 14.80 |
| C4 | 57.8 | 36.2 | 2.4 | 15.20 |
| Second series of tests |
| C2 | 35.7 | 22.3 | 2.11 | 10.43 |
| C3 | 35.7 | 22.3 | 2.11 | 12.33 |
| C5 | 35.7 | 22.3 | 2.11 | 12.33 |

The second mortar compositions are then prepared by adding the releaser which is that of example 1; it is inserted within 1 hour after kneading all the constituents of the first compositions.

The amount for each mortar is 14.7 g.

For each mortar, the spread obtained during flow test will be measured in mm after 15, 60, 90, 120 minutes counted from the end of the kneading of the first composition and as of the end of the kneading of the second composition, the test pieces intended for measuring the compression mechanical strengths Rc will be prepared.

The deadline for measuring the mechanical strength after 4 hours and 5 hours and a half is counted after the end of the kneading operation of the first composition.

The RC 2 is measured 2 hours after adding the releaser.

The results obtained are as follows:

TABLE 8

| | CEM2 ref. | 15 mn flow | 60 mn flow | 90 mn flow | 120 mn flow | 2 hour Rc | 4 hour MPa Rc | 5 hour 30 MPa RC |
|---|---|---|---|---|---|---|---|---|
| First series of tests | C1 | 330 | 320 | 295 | 260 | 1 | 2.4 | 10.4 |
| | C2 | 365 | 285 | 285 | 215 | 2 | 3.5 | 3.8 |
| | C3 | 330 | 300 | 135 | NM | 6 | 13.8 | 19.5 |
| | C4 | 305 | 235 | 225 | 225 | 5 | 10.7 | 18.7 |
| Second series of tests | C2 | 340 | 275 | 265 | 140 | 2.3 | 4.8 | 11.3 |
| | C3 | 300 | 295 | 225 | 145 | 1.5 | 3.8 | 6.3 |
| | C5 | 330 | 265 | 200 | 195 | 0.7 | 1.8 | 4.3 |

These results put in evidence that the requirements imposed by the different CEM 2 cements used are met.

The invention claimed is:

1. A method for making concrete parts and structures, comprising:
   (i) supplying a first concrete composition based on a quick setting and hardening binder containing:
      60 to 95% Portland cement;
      5 to 40% curing accelerator comprising $Al_2O_3$ alumina, lime and sulfate;
      a retarder; and
      a superplasticizer polymer selected from the group consisting of polyphosphonate polyox, and polycarboxylate polyox, or mixture thereof,;
   then
   (ii) adding a releaser to form a second concrete composition selected from the group consisting of:
      aqueous suspension containing:
         (i) at least one calcium aluminate,
         (ii) from 0.5 to 4% in weight relative to the total weight of the calcium aluminate(s), of a setting inhibitor of the aluminous cements, and
         (iii) at least one settling-preventing agent;
      a transition alumina;
      an alumina hydroxide gel;
      a mixture thereof; and
   (iii) pouring this second concrete composition in a concrete form.

2. The method according to claim 1, wherein the curing accelerator contains, in weight:

| | |
|---|---|
| $Al_2O_3$ alumina: | 35 to 50% |
| lime: | 10 to 50% |
| Sulfate: | 5 to 30%. |

3. The method according to claim 1, wherein the curing accelerator comprises calcium aluminate and calcium sulfate.

4. The method according to claim 1, wherein the sulfate is selected from the group consisting of metallic, alkaline, alkaline-earth sulfates, the organic sulfates or the mixtures thereof.

5. The method according to claim 1, wherein the step (i) is a wet mixing step wherein the first primary composition is prepared and which contains the following steps :
   (a) a concrete composition is prepared containing:
      Portland cement;
      the retarder; and
      the superplasticizer;
   then
   (b) adding, on the
      curing accelerator.

6. The method according to claim 1, wherein the step (ii) is implemented at least 10 minutes but no later than 8 hours after wet mixing of the step (i).

7. The method according to claim 1, wherein the step (ii) is implemented immediately before the concrete pouring step (iii).

8. The method according to claim 1, including the following steps:
   (i) supplying by wet mixing in a ready-mix plant a first concrete composition based on a quick setting and hardening binder;
   then
   (ii) adding a releaser; and
   (iii) pouring the concrete immediately after the releaser addition step (ii).

9. The method according to claim 7, wherein the step (ii) is implemented in a truck-mixer.

10. The method according to claim 1, wherein the step (iii) comprising pouring the second concrete composition in a concrete form is conducted with a second concrete composition exhibiting a slump test value ranging between 15 and 24 cm.

11. The method according to claim 1, wherein the step (iii) comprising pouring the second concrete composition in a concrete form is conducted with a second concrete composition exhibiting a slumpflow value ranging between 580 and 750 mm.

12. The method according to claim 1, wherein the concrete parts and structures are concrete shells or concrete slabs.

13. The method according to claim 1, wherein the first concrete composition contains:

70 to 85% Portland cement;
15 to 25% curing accelerator;
the retarder; and
the superplasticizer.

14. The method according to claim 1, wherein the Portland cement is a cement complying with the EN 197-1 standard.

15. The method according to claim 1, wherein the curing accelerator comprises calcium aluminate and calcium sulfate in semi-hydrate, dihydrate or anhydrite form.

16. The method according to claim 1, wherein the calcium aluminate used includes at least one of CA, C3A and C12A7 phases.

17. The method according to claim 3, wherein the mass ratio between the calcium aluminate and the calcium sulfate ranges between 1:4 and 4:1.

18. The method according to claim 1, wherein the retarder is carboxylic or boric acid or its salts.

19. The method according to claim 1, wherein the amount of the retarder, in weight relative to the cumulated weight of the Portland cement and of the curing accelerator, ranges between 0.05 and 5%.

20. The method according to claim 1, wherein the amount of the superplasticizer, in weight relative to the cumulated weight of the Portland cement and of the curing accelerator, ranges between 0.5 and 5%.

21. The method according to claim 1, wherein the amount of the releaser, in weight relative to the cumulated weight of the Portland cement and of the curing accelerator, is 1 to 10%%.

22. The method according to claim 1, wherein the second concrete composition exhibits a compression mechanical strength of at least 1 MPa, 2 hours after the step (ii).

23. The method according to claim 1, wherein the second concrete composition exhibits a compression mechanical strength of at least 1 MPa, 4 hours after the step (i).

24. The method according to claim 1, wherein the first concrete composition has a workability keeping time of at least 1 hour after step (i).

25. The method according to claim 1, wherein the second concrete composition has a workability keeping time of at least 30 minutes after step (ii).

* * * * *